US009574900B2

(12) United States Patent
Abe

(10) Patent No.: US 9,574,900 B2
(45) Date of Patent: Feb. 21, 2017

(54) NAVIGATION APPARATUS AND METHOD FOR DRAWING MAP

(71) Applicant: Alpine Electronics, Inc., Tokyo (JP)

(72) Inventor: Makoto Abe, Tokyo (JP)

(73) Assignee: Alpine Electronics, Inc., Tokyo (JP)

(*) Notice: Subject to any disclaimer, the term of this patent is extended or adjusted under 35 U.S.C. 154(b) by 173 days.

(21) Appl. No.: 14/272,033

(22) Filed: May 7, 2014

(65) Prior Publication Data
US 2014/0354696 A1    Dec. 4, 2014

(30) Foreign Application Priority Data
May 28, 2013  (JP) ................................. 2013-111550

(51) Int. Cl.
*G09G 5/00*     (2006.01)
*G01C 21/36*    (2006.01)

(52) U.S. Cl.
CPC ................... *G01C 21/367* (2013.01)

(58) Field of Classification Search
CPC . G06T 11/60; G06T 3/00; G06T 11/00; G06T 11/203; G06T 15/40; G06T 2200/28; G06T 15/20; G06T 17/05; G06T 1/00; G06T 17/00; G01C 21/367; G01C 21/36; G06F 3/14; H04N 19/17; H04N 9/3182; G09B 29/00
See application file for complete search history.

(56) References Cited

U.S. PATENT DOCUMENTS

| 2009/0105948 A1* | 4/2009 | Chang .......................... 701/209 |
| 2011/0115792 A1* | 5/2011 | Tamaoki ....................... 345/426 |
| 2014/0125685 A1* | 5/2014 | Yeh et al. ..................... 345/545 |

FOREIGN PATENT DOCUMENTS

| JP | H11237834  | 8/1999 |
| JP | 2006-058530 | 3/2006 |
| JP | 2010-272032 | 12/2010 |

* cited by examiner

*Primary Examiner* — James A Thompson
*Assistant Examiner* — Xilin Guo
(74) *Attorney, Agent, or Firm* — Brinks Gilson & Lione

(57) ABSTRACT

A navigation apparatus includes a map data storage apparatus which obtains map data needed for drawing an object; a map buffer; a map drawing unit which generates image information corresponding to an object included in a background image on the basis of the map data, and stores the image information in a frame buffer; and a display processing unit which reads out the image information stored in the frame buffer and displays a map image on a display apparatus. The map drawing unit generates shadow image information for a shadow region of the object which is a region sandwiched between an outline of the object and an outline of the object after the object has been moved in a predetermined direction.

10 Claims, 4 Drawing Sheets

FIG. 3
| STEP | FRAME MEMORY | WORKING MEMORY |
|---|---|---|
| 100 | 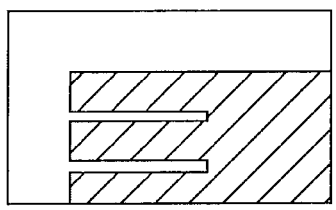 | |
| 102 | |  |
| 104 | | 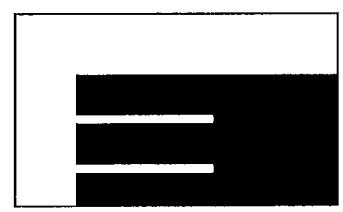 |
| 106 | | 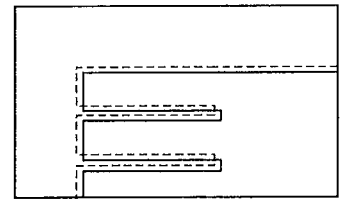 |

FIG. 4
| STEP | FRAME MEMORY | WORKING MEMORY |
|------|--------------|----------------|
| 108  |              | 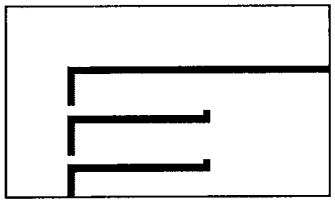 |
| 110  | 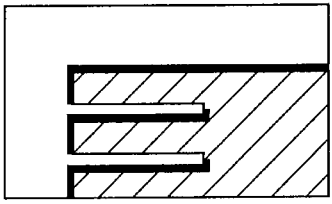 |        |

NAVIGATION APPARATUS AND METHOD FOR DRAWING MAP

RELATED APPLICATION

The present application claims priority to Japanese Patent Application Number 2013-111550, filed May 28, 2013, the entirety of which is hereby incorporated by reference.

BACKGROUND

1. Field of the Invention

The present invention relates to a navigation apparatus which displays a map image and the like around a position of a vehicle and a method for drawing the map.

2. Description of the Related Art

A navigation apparatus has been known in which, in order to stereoscopically display a specific background polygon representing a water area, the specific background polygon is displayed after reduction conversion with its center-of-gravity as the center, and an area between the polygon before and after the reduction conversion of the specific background polygon is displayed as a frame polygon (see, for example, Japanese Unexamined Patent Application Publication No. 2006-58530). In this navigation apparatus, a color expressing a shadow is added on the upper face of the specific background polygon and on the side face shown by the frame polygon, for drawing the specific background polygon under a light source at a predetermined position.

In the simplest method, images of buildings and the like can be moved in an oblique direction and shadows can be added thereto. In this method, however, there has been a problem in that if a water-related object having a specific shape, for example a water-related object having a shape of the sea with a narrow pier extending thereover, is moved in an oblique direction, the narrow pier would be covered by the shadow and would no longer be visible. On the other hand, in the navigation apparatus disclosed in Japanese Unexamined Patent Application Publication No. 2006-58530, such a problem does not arise because shadow images are generated by using the shape of the sea which has been reduced; however, a reduction conversion is necessary to add shadows, which results in a complicated process.

SUMMARY

An object of the present disclosure is to provide a navigation apparatus and a method for drawing a map in which a shadow is added to an object by a simple process without interrupting a surrounding image while displaying a map.

A navigation apparatus according to one embodiment of the invention includes a map data obtaining unit which obtains map data needed for drawing an object; a drawing unit which generates image information corresponding to the object on the basis of the map data, and stores the image information in a frame buffer; and a display processing unit which reads out the image information stored in the frame buffer and displays a map image on a display apparatus. The drawing unit generates image information representing a shadow for a shadow region of the object which is a region sandwiched between an outline of the object and an outline of the object after the object has been moved in a predetermined direction.

A method for drawing a map according to one embodiment of the invention includes a map data obtaining step for obtaining map data needed for drawing an object using a map data obtaining unit; a drawing step for generating image information corresponding to the object on the basis of the map data, and storing the image information in a frame buffer using a drawing unit; and a display processing step for reading out the image information stored in the frame buffer and displaying a map image on a display apparatus using a display processing unit. In the drawing step, the drawing unit generates image information representing a shadow for a shadow region of the object which is a region sandwiched between an outline of the object and an outline of the object after the object has been moved in a predetermined direction. In particular, the object is preferably a water-related object included in a background image.

In such a manner, it is possible to add a shadow to a water-related object. Even when the water-related object includes a land part such as a narrow pier, the land part can be prevented from being interrupted. In addition, since image information representing a shadow is generated by offsetting the object in a predetermined direction, an image of a shadow can be generated by a simple process compared with a case where the image is subjected to reduction conversion.

In addition, the navigation apparatus according to another embodiment of the invention preferably further includes a working area storage unit which has the same size as a working area of the frame buffer. In such a case, the drawing unit generates a shadow image for the object by generating a first image corresponding to the object with a shadow color, storing the first image in the working area storage unit, generating a transparent second image of the object moved in a predetermined direction, and overwriting the first image with the transparent second image. In such a manner, in the case where an object to which a shadow is to be added extends across a plurality of pages, a shadow portion can be generated accurately, without being affected by a boundary between the pages. Thus, defects in display along the boundary, which would be caused when a plurality of pages form a map image, can be prevented.

It is preferable that the predetermined direction is a direction towards a lower right portion of a display screen so that a shadow is added to an upper left part of the object, which makes a surface of the water-related object be shown below a land surface.

Further, it is preferable that the drawing unit executes a drawing process of the object, and then overwrites the drawing result with the shadow image. In such a manner, besides an object to which a shadow is to be added, another object can be also subjected to a drawing process at the same time, then a shadow image can be added. A process procedure can be thus simplified.

BRIEF DESCRIPTION OF THE DRAWINGS

FIG. 3 illustrates a drawing state according to the operational procedure illustrated in FIG. 2.

FIG. 4 illustrates a drawing state according to the operational procedure illustrated in FIG. 2.

DETAILED DESCRIPTION OF THE PREFERRED EMBODIMENTS

Figure 1:
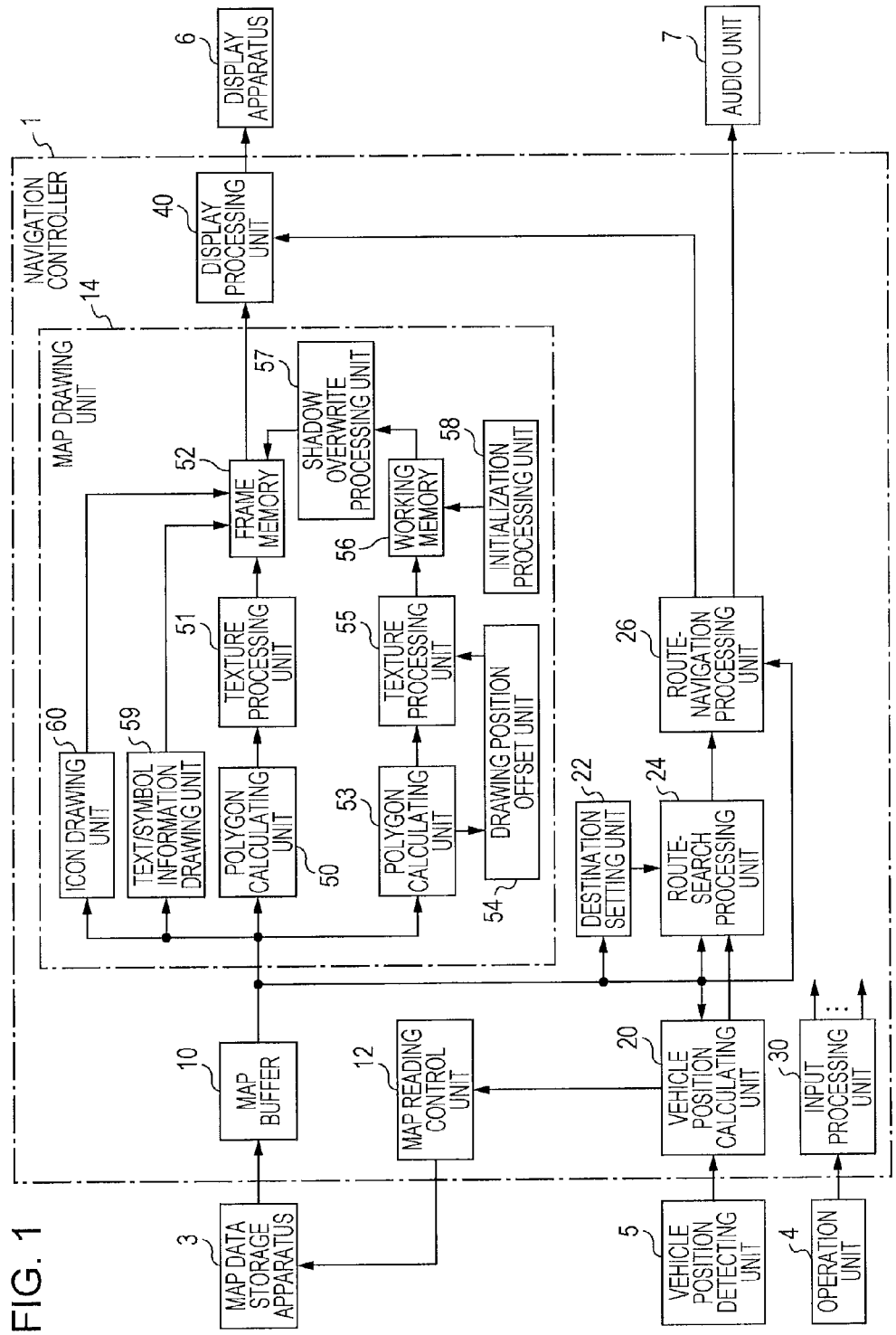
FIG. 1 illustrates a detailed structure of a navigation apparatus according to an embodiment.

A navigation apparatus according to an embodiment of the invention will be described with reference to the accompanying drawings. FIG. 1 illustrates a structure of a navigation apparatus according to the embodiment. The navigation apparatus in FIG. 1 includes a navigation controller 1, a map data storage apparatus 3, an operation unit 4, a vehicle position detecting unit 5, a display apparatus 6, and an audio unit 7. This navigation apparatus is mounted in a vehicle.

The navigation controller 1 carries out various functions such as an image display operation of a map of an area around the vehicle, a facility searching operation, or a route searching and guiding operation, by executing predetermined operation programs with a CPU, a ROM, a RAM, and the like. The structure of the navigation controller 1 will be described later in detail.

The map data storage apparatus 3 includes a storage medium and an apparatus for reading the data in the storage medium. The storage medium stores map data needed for displaying maps, searching for facilities, searching for routes, and the like. The map data storage apparatus 3 stores map data in the form of rectangular pages each having an appropriate size divided by lines of longitude and latitude. Each of the pages has its own number with which it can be identified to be read out.

This map data is represented by a set of coordinates of dots (or nodes) that represent longitudes and latitudes. A road is represented by two or more nodes which are connected to each other. A portion which connects two nodes with each other is referred to as a link. The map data includes road data for map matching and route searching, such as a road list, a node table, an intersection-constituting node list, an intersection net list; background data for displaying various objects such as roads, parks, rivers, landmark buildings, facilities, and the like on the map; and text/symbol data for displaying text such as administrative district names such as names of cities, towns, and villages, road names, intersection names, building names, map symbols, and the like.

Among the various types of data included in the map data, the background data particularly relates to the present disclosure. The data structure is not specifically illustrated. The background data includes data with a wide variety of shapes, such as water-related polygons representing the sea, lakes, or the like; land-use polygons representing forests, fields of rice, fields, built-up areas, or the like; address polygons representing administrative district boundaries; building polygons representing buildings; and premises polygons representing premises of facilities.

The map data storage apparatus 3 includes a hard disk device, a semiconductor memory, or a DVD and its player. A communication device may alternatively be used as the map data storage apparatus 3, and map data may be obtained from an external map data distribution server (not shown).

The operation unit 4 receives instructions (or operations) from a user. The operation unit 4 includes various types of operation buttons and operation knobs. The operation unit 4 also may include a touch screen mounted on a screen of the display apparatus 6. A user can control the device by touching a portion on a screen directly with their finger or the like. The vehicle position detecting unit 5 includes, for example, a GPS receiver, a direction sensor, and a distance sensor. The vehicle position detector 5 detects the position (longitude and latitude) of the vehicle at specific times, and outputs a result of the detection.

The display apparatus 6 includes, for example, an LCD (liquid crystal display). The display apparatus 6 displays, based on image signals output from the navigation controller 1, a map image of a region including the vehicle position, an intersection guidance image, a search result obtained by searching facilities and parking facilities therearound, and the like. The display apparatus 6 may be, for example, mounted in a housing of the navigation apparatus placed in the center or on the dashboard. Note that the display apparatus 6 may be separated from the housing of the navigation apparatus and mounted in a manner such that the display apparatus 6 can be easily seen by the driver. The audio unit 7 outputs audio guidance and the like, generated on the basis of an audio signal output from the navigation controller 1, inside a vehicle.

Next, a detailed structure of the navigation controller 1 will be described. The navigation controller 1 in FIG. 1 includes a map buffer 10, a map reading control unit 12, a map drawing unit 14, a vehicle position calculating unit 20, a destination setting unit 22, a route-search processing unit 24, a route-navigation processing unit 26, an input processing unit 30, and a display processing unit 40.

The map buffer 10 temporarily stores map data which is read out from the map data storage apparatus 3. The map reading control unit 12 outputs a request to the map data storage apparatus 3 for reading map data of a specified range which corresponds to a vehicle position calculated by the vehicle position calculating unit 20 and/or a position specified by a user operating the operation unit 4. The map drawing unit 14 executes a drawing process using the map data stored in the map buffer 10 to generate map-image drawing data in order to display a map image on the display apparatus 6. Details of the map drawing unit 14 will be described later.

The vehicle position calculating unit 20 calculates the vehicle position using detection data output from the vehicle position detecting unit 5. When the calculated vehicle position does not exist on a road in the map data, the vehicle position calculating unit 20 executes a map matching process for correcting the vehicle position.

The destination setting unit 22 sets a destination point of a route searching process. For example, the destination setting unit 22 searches for a facility that satisfies a search criterion provided by a user and sets the facility as the destination point. The route-search processing unit 24 searches for a traveling route (a navigation route) that connects a starting point and a destination point (or an intermediate point) in accordance with the search criterion. The route-navigation processing unit 26 generates navigation-route drawing data for displaying the navigation route found in the route searching process by the route-search processing unit 24 on the map or for displaying an enlarged view of an intersection where the vehicle is to turn right or left. The route-navigation processing unit 26 also generates an audio signal needed to guide the vehicle along the navigation route, such as guidance at intersections.

The input processing unit 30 outputs instructions to relevant units in the navigation controller 1 for executing operations corresponding to various operation commands which are input from the operation unit 4. The display processing unit 40 displays a map image of a specified area on the display apparatus 6 using drawing data, which is map-image drawing data generated by the map drawing unit 14 and is input to the display processing unit 40.

Next, details of the map drawing unit 14 will be described. As illustrated in FIG. 1, the map drawing unit 14 includes polygon calculating units 50 and 53, texture processing units 51 and 55, a frame memory 52, a drawing position offset unit 54, a working memory 56, a shadow overwrite processing unit 57, an initialization processing unit 58, a text/symbol information drawing unit 59, and an icon drawing unit 60. In this embodiment, map images to be displayed include background images and text/symbol information and icons which are displayed on the background image. The background images include water-related images of the sea, lakes, and the like and land-related images of roads, buildings, forests, and the like. These structural elements of regions are represented by polygons. Each element includes a polygon. The background image is generated by a texture mapping process in which texture images are provided to respective polygons. In addition, text/symbol information such as names of areas and map symbols and icon images for representing specific facilities which are requested to be displayed are overlapped on the background image and composed to make a map image.

The polygon calculating unit 50 calculates vertex coordinates of polygons forming water-related and land-related objects of background images. The texture processing unit 51 executes a texture mapping process where a texture image is attached to each polygon on the basis of the vertex coordinates of the polygons which are calculated. For example, if a water-related object representing the sea is included as a part of the background image, the texture processing unit 51 attaches a texture image with a color which gives an impression of the sea (a blue-colored image) to the polygon forming the water-related object. In such a manner, map-image drawing data corresponding to the background image is generated. The map-image drawing data thus generated is stored in the frame memory 52. The frame memory 52 stores map-image drawing data for a plurality of pages corresponding to the current display scale. For example, map-image drawing data for nine pages in total, one page for the vehicle and eight pages to display an area around the vehicle, is stored when a map image around the vehicle is to be displayed.

The polygon calculating unit 53 calculates vertex coordinates of polygons forming a water-related object when the water-related object is included as a part of the background image. The calculation of the vertex coordinate of polygons forming a water-related object is the same as that of the polygon calculating unit 50; therefore, the polygon calculating unit 53 may be omitted when the calculation result of the polygon calculating unit 50 is used. The drawing position offset unit 54 offsets the vertex coordinates of the polygons representing the water-related object which are calculated by the polygon calculating unit 53 towards the lower right (i.e., lower right on a display screen), that is, moves the vertex positions towards the lower right. The texture processing unit 55 executes a texture mapping process in which a texture image with a shadow color is attached to each polygon on the basis of the vertex coordinates of the polygons which are calculated by the polygon calculating unit 53. In addition, the texture processing unit 55 executes a texture mapping process in which a transparent texture image is attached to each polygon on the basis of the vertex coordinates after the offset by the drawing position offset unit 54. The working memory 56 has the same size and storage position as the frame memory 52. The working memory 56 stores drawing data with a shadow color or a transparent color generated by the texture processing unit 55. The shadow overwrite processing unit 57 overwrites the drawing data stored in the working memory 56 with the drawing data stored in the frame memory 52. The initialization processing unit 58 initializes the working memory 56 with a transparent color; specifically, the initialization processing unit 58 writes transparent image data in all the storage regions for initialization.

The text/symbol information drawing unit 59 draws images of a variety of text information including names of areas and buildings in the areas to be displayed, which are to be overlapped with the map image. The icon drawing unit 60 draws icon images of specified facilities which are requested to be displayed (for example, if display of icons representing convenience stores is requested, icon images of several shapes each corresponding to different types of convenience stores are displayed). The text information and icons are overlapped with map-image drawing data corresponding to the background images stored in the frame memory 52.

The above-described map data storage apparatus 3 and the map buffer 10 correspond to a map data obtaining unit, the map drawing unit 14 corresponds to a drawing unit, the display processing unit 40 corresponds to a display processing unit. Further, an operation of obtaining map data using the map data storage apparatus 3 and the map buffer 10 corresponds to an operation of a map data obtaining step, a drawing operation of using the map drawing unit 14 (specifically, an operation described later with reference to FIG. 2) corresponds to an operation of a drawing step, and an operation of displaying a map image using the display processing unit 40 corresponds to an operation of a display processing step.

Figure 2:
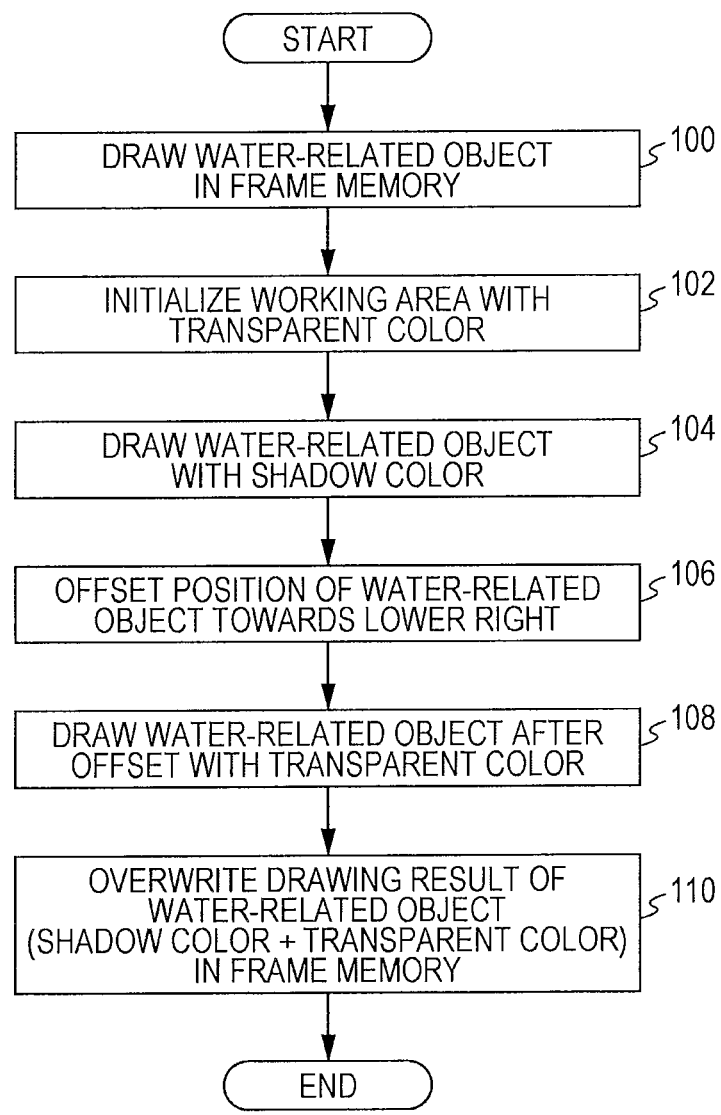
FIG. 2 is a flow chart of an operational procedure for adding a shadow to a water-related object.

The navigation apparatus according to this embodiment has the structure described thus far. Next, an operation of a drawing process for adding a shadow to an object will be described. FIG. 2 is a flow chart of an operational procedure for adding a shadow to a water-related object. FIGS. 3 and 4 illustrate drawing states corresponding to the operational procedure illustrated in FIG. 2.

First, the polygon calculating unit 50 calculates vertex coordinates of polygons forming a water-related object of a background image. The texture processing unit 51 executes a texture mapping process where a texture image of a water-related object is attached to each polygon on the basis of the vertex coordinates of the polygons which are calculated. Thus, the drawing process for a water-related object is performed and the drawing result is written in the frame memory 52 (Step 100). Note that if an object other than the water-related object is included, a drawing process for the object is also performed at the same time and the drawing result is written into the frame memory 52.

Then, the initialization processing unit 58 initializes the working memory 56 (a working area) using transparent image data (Step 102). The polygon calculating unit 53 calculates vertex coordinates of polygons forming the water-related object. The texture processing unit 55 executes a texture mapping process where a texture image of a shadow color is attached to each polygon on the basis of the vertex coordinates of the polygons which are calculated. Thus, the water-related object is drawn with a shadow color (Step 104). The drawing result is stored in the working memory 56.

Then, the drawing position offset unit 54 offsets the vertex coordinates of the polygons representing the water-related object which are calculated by the polygon calculating unit 53 towards the lower right (Step 106). The texture processing unit 55 executes a texture mapping process where a transparent texture image is attached to each polygon on the basis of the vertex coordinates after the offset. Thus, the water-related object which is offset to the lower right is drawn with a transparent color (Step 108). The drawing result is written over the previously stored data and stored in the working memory 56.

By the two drawing processes in Steps 104 and 108, an image of a water-related object with a shadow along an inner side of an upper-left portion of the object is generated. The shadow overwrite processing unit 57 reads out the generated shadow image from the working memory 56 and writes the data in a relevant position in the frame memory 52 over the previously stored data (Step 110).

In such a manner, in the navigation apparatus according to this embodiment, it is possible to add a shadow to a water-related object. Even when the water-related object includes a land part such as a narrow pier, the land part can be prevented from being interrupted. In addition, since image information representing a shadow is generated by offsetting the object in a predetermined direction, the image of a shadow can be generated by a simple process compared with a case where the image is subjected to reduction conversion.

In addition, in the case where an object to which a shadow is to be added extends across a plurality of pages, a shadow portion can be generated accurately, without being affected by a boundary between pages. Thus, defects in display along the boundary, which would be caused when a plurality of pages form a map image, can be prevented.

In addition, the object is moved towards the lower right on a display screen in order to generate a shadow. In such a manner, a shadow is generated in an upper left part of the object, which makes a surface of the water-related object be shown below a land surface.

In addition, besides an object to which a shadow is to be added, another object can be also subjected to a drawing process at the same time, then a shadow image can be added. A process procedure can be thus simplified.

Various modifications to these embodiments can be made. For example, although a shadow is added to a water-related object image represented by polygons in the above embodiment, the invention can be applied to the case where a shadow is added to an object image which is not represented by polygons. Further, a shadow may be added to an object other than a water-related object.

Further, in the above embodiment, although the working memory 56 is provided in addition to the frame memory 52, a part of the frame memory 52 may be used instead of the separate working memory 56.

Further, in the above embodiment mode, a shadow of a water-related object is generated in an upper left portion of the object under the assumption that the sun is in the upper left side of a map. If the assumed position of the sun changes, the position of a shadow may change accordingly. In addition, for an object which is not a water-related object and which is higher than the land surface (for example, buildings), a shadow on the upper right portion of the object may be colored with a bright color by the same procedure, so that an object which is higher than the land surface and receiving light on one side thereof can be drawn.

As described above, according to the invention, it is possible to add a shadow to an object such as a water related object. Even when the water-related object includes a land part such as a narrow pier, the land part can be prevented from being covered. In addition, since image information representing a shadow is generated by offsetting the object in a predetermined direction, the image of a shadow can be generated by a simple process compared with a case where the image is reduced.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof Therefore, it is intended that this invention not be limited to the particular embodiments disclosed, but that the invention will include all embodiments falling within the scope of the appended claims.

What is claimed is:

1. A navigation apparatus comprising:
  a map data obtaining unit which obtains map data needed for drawing an object;
  a drawing unit which generates image information corresponding to the object on the basis of the map data, and stores the image information in a frame buffer; and
  a display processing unit which reads out the image information stored in the frame buffer and displays a map image on a display apparatus,
  wherein the drawing unit generates image information representing a shadow for a shadow region of the object which is a region sandwiched between an outline of the object and an outline of the object after the object has been moved in a predetermined direction, where the drawing unit generates the image information such that the shadow is positioned along an inner side of the object.

2. The navigation apparatus according to claim 1, wherein the object is a water-related object included in a background image.

3. The navigation apparatus according to claim 1, further comprising:
  a working area storage unit which has the same size as a working area of the frame buffer,
  wherein the drawing unit generates a shadow image for the object by generating a first image corresponding to the object with a shadow color, storing the first image in the working area storage unit, generating a transparent second image which is an image of the object moved in a predetermined direction, and overwriting the first image with the transparent second image.

4. The navigation apparatus according to claim 3, wherein the predetermined direction is a direction towards a lower right portion of a display screen.

5. The navigation apparatus according to claim 3, wherein the drawing unit executes a drawing process of the object, and then overwrites a drawing result with the shadow image.

6. A method for drawing a map, comprising:
  a map data obtaining step for obtaining map data needed for drawing an object using a map data obtaining unit;
  a drawing step for generating image information corresponding to the object on the basis of the map data, and storing the image information in a frame buffer using a drawing unit; and
  a display processing step for reading out the image information stored in the frame buffer and displaying a map image on a display apparatus, using a display processing unit,
  wherein, in the drawing step, the drawing unit generates image information representing a shadow for a shadow region of the object which is a region sandwiched between an outline of the object and an outline of the object after the object has been moved in a predetermined direction, where the drawing unit generates the image information such that the shadow is positioned along an inner side of the object.

7. The method for drawing a map according to claim 6, wherein the object is a water-related object included in a background image.

8. The method for drawing a map according to claim 6, wherein:

a working area storage unit has the same size as a working area of the frame buffer, wherein in the drawing step, a shadow image for the object is generated by generating a first image corresponding to the object with a shadow color, storing the first image in the working area storage unit, generating a transparent second image which is an image of the object moved in a predetermined direction, and overwriting the first image with the transparent second image.

9. The method for drawing a map according to claim 8, wherein the predetermined direction is a direction towards a lower right portion of a display screen.

10. The method for drawing a map according to claim 8, wherein the drawing unit executes a drawing process of the object, and then overwrites a drawing result with the shadow image.

\* \* \* \* \*